(No Model.)
L. J. ATWOOD.
SHADE HOLDER.
No. 387,755.   Patented Aug. 14, 1888.
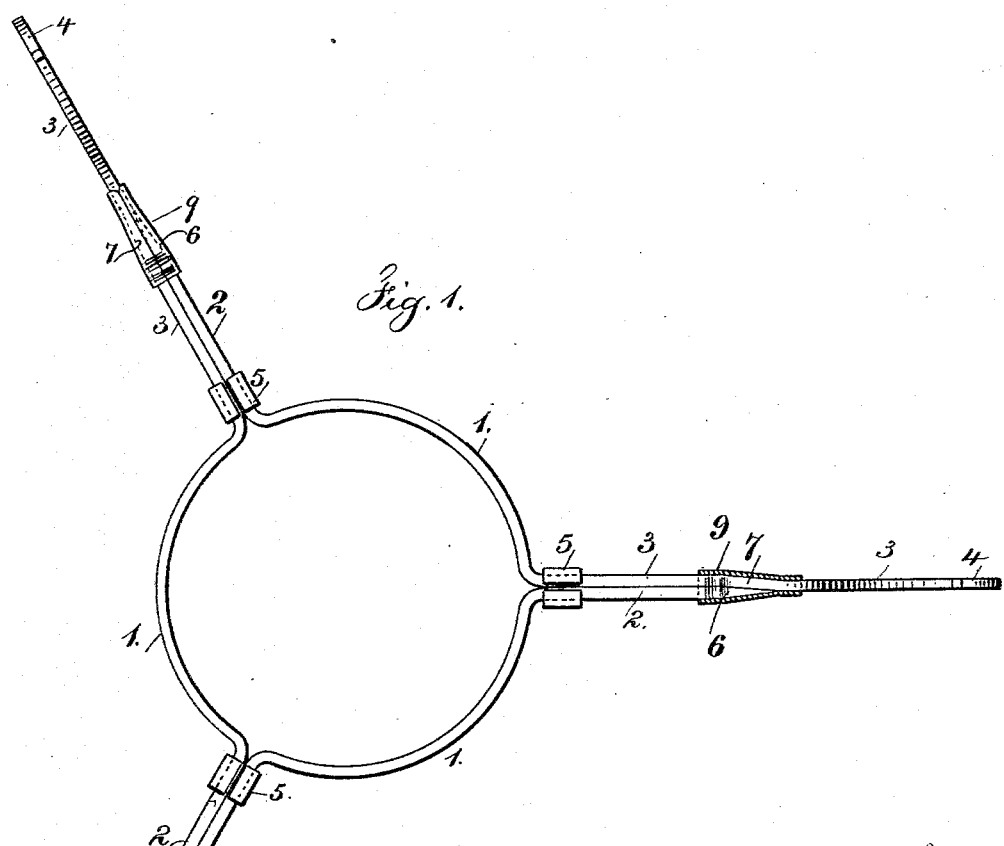
Inventor
Lewis J. Atwood.
per Lemuel W. Serrell
Atty
Witnesses
Chas. H. Smith
J. Staib

UNITED STATES PATENT OFFICE.

LEWIS J. ATWOOD, OF WATERBURY, CONNECTICUT, ASSIGNOR TO THE PLUME & ATWOOD MANUFACTURING COMPANY, OF SAME PLACE.

SHADE-HOLDER.

SPECIFICATION forming part of Letters Patent No. 387,755, dated August 14, 1888.

Application filed January 3, 1888. Serial No. 259,605. (No model.)

*To all whom it may concern:*

Be it known that I, LEWIS J. ATWOOD, of Waterbury, in the county of New Haven and State of Connecticut, have invented an Improvement in Shade-Holders for Lamps, of which the following is a specification.

Shade-holders have heretofore been made with three arms, each arm being in two parts and there being an arc bent in the wire between the two straight portions of the arm, so that when placed together a ring is formed with the arms projecting radially, and there are slide-clamps upon the double portions of the arms, so that the ring is made to grasp and hold around the chimney-holder of the lamp; but the arms are objectionable in appearance because there is an abrupt hook upon the shorter portion of each arm that connects with the longer portion of the adjacent arm. A chimney-holder of this character is represented in Letters Patent No. 104,558.

My present improvement relates to a sheet-metal fastening that unites the short arm to the long arm and enables me to make each arm uniform and symmetrical and stronger than those heretofore constructed.

In the drawings, Figure 1 is a plan view showing the shade-holder with one of the clamps in section, and Fig. 2 is a similar side view of the same.

The three sections forming the shade-holder are each composed of wire, as an arc, 1, a short arm, 2, and a long arm, 3, and at the end of each long arm is a hook, 4, or similar holding device for the edge of the lamp-shade. The sections are placed together in the manner represented and the sliding clamps 5 are provided on the respective arms for drawing the two parts of the arms together and clamping the sections upon the base of the chimney-holder, as heretofore usual. The outer ends, 6, of the short arms are cut off diagonally and the longer arms adjacent to the same are bent inwardly with a compound bend, as at 7, so that the outer portion of the long arm is in line with the divisions between the two portions of the arms that lie side by side, and I place around the end 6 of the short arms and the bend 7 a sheet-metal clip, 9, properly shaped, so that when bent up and wrapped around the arms at their junction the clip will be conical and set closely against the single portion of the long arm and around the short arm near its outer end, so as to tie both arms firmly together, and after this is done the clip and the arms are bent downwardly with a short corrugation, so as to prevent the sheet-metal clip slipping in either direction upon the arms, and to prevent the end of the short arm slipping out of the clip. This construction renders the union of the two arms firm and reliable and at the same time the appearance is much neater and more workmanlike than in shade-holders heretofore constructed.

I claim as my invention—

1. A shade-holder having projecting radial arms, each arm being composed of one long projecting wire and a short wire, in combination with a separate and independently-attached conical or tapering sheet-metal clip surrounding the two parts of the arm at the end of the short arm and confining the parts together, substantially as set forth.

2. A shade-holder having projecting radial arms, each arm being composed of one long projecting wire and a short wire, in combination with a tapering or conical sheet-metal clip applied to each arm at the junction of the two parts thereof, the short arm having a tapering end and the long arm being bent within the clip and both arms and the clip having a corrugation or bend to prevent end motion, substantially as set forth.

Signed by me this 29th day of December, 1887.

LEWIS J. ATWOOD.

Witnesses:
 GEO. T. PINCKNEY,
 WILLIAM G. MOTT.